UNITED STATES PATENT OFFICE.

CHARLES A. CATLIN, OF PROVIDENCE, RHODE ISLAND.

DISINFECTANT.

SPECIFICATION forming part of Letters Patent No. 294,759, dated March 11, 1884.

Application filed July 30, 1883. (Specimens.)

*To all whom it may concern:*

Be it known that I, CHARLES A. CATLIN, of Providence, in the State of Rhode Island, have made certain new and useful Improvements in Disinfectants; and I do hereby declare that the following specification is a full, clear, and exact description thereof.

The object of my invention is to produce a disinfecting composition in a solid form, which shall gradually part with its exterior surface and yield its disinfecting ingredients through the action of water or other liquid passing over it; and it consists in the combination of materials and the method of uniting and retaining of the same in a solid mass, as hereinafter described.

The value of chloride of zinc as a disinfectant is well known. It has heretofore been used in the form of a solution only. In a solid form it is so deliquescent and soluble as to be practically useless in many places where it might otherwise be of great utility. Its extreme solubility not only results in a great waste of material, but occasions, in the necessity for its frequent renewal, much trouble and inconvenience.

In my invention I melt together chloride of zinc and boracic acid, which in cooling crystallizes and becomes a compact and homogeneous solid, the deliquescent and soluble character of which is regulated or adjusted by the amount of boracic acid introduced or used in the composition. Boracic acid itself possesses valuable antiseptic and disinfecting properties, and the mixture of the same with chloride of zinc, whether the preparation be a solution or solid, produces a compound containing greater disinfecting properties than are to be found in either alone.

In preparing the solid disinfectant I do not confine myself to any particular proportion of the ingredients used, as the proportions must be determined by the nature of the place in which the compound is to be used and the work required of it. In disinfecting urinals, for instance, an excellent result might be obtained by combining one part of boracic acid and one part of chloride of zinc, or a corresponding amount of a solution of zinc chloride.

In compounding the mixture I put in a porcelain-lined vessel one pound of boracic acid (commercial) and two pounds of a fifty-per-cent. solution of chloride of zinc, and heat them over a fire. As the mixture is brought to the boiling-point, the boracic acid assumes a gelatinous consistency and dissolves gradually as the boiling continues, resulting in a clear liquid fusion, which, when removed from the fire, crystallizes and hardens into a white opaque solid. Before cooling, however, the liquid is poured into molds and given any desired shape as it hardens therein, after which it is removed, and should, on account of its deliquescent character, be protected from the air by varnishing, coating with wax, or in some other suitable manner. The best protection that I have found is to wrap tin-foil or paper around it and then dip the whole in melted paraffine, as the same can be easily and quickly removed when the inclosure is desired for use.

In melting the chloride of zinc and boracic acid together, if the heating is continued beyond the clear fusion, fumes of hydrochloric acid are given off, and cooling at different stages in this process will give solids all the way from translucent to transparent. I prefer, however, to stop the process at the first stage. The product thus obtained is far less soluble in water than zinc chloride, and far less deliquescent.

I regard a slight deliquescence as of great value, inasmuch as it secures and maintains, to some extent, a supply of the disinfecting material through the absorption of moisture during the time when the wetting or flushing is interrupted.

I do not claim, broadly, the uniting of boracic acid and zinc.

What I claim as my invention, and desire to secure by Letters Patent, is—

A solid disinfecting compound composed of chloride of zinc and boracic acid molded or formed into masses of any desired shape, for the purposes specified.

CHAS. A. CATLIN.

Witnesses:
WALTER B. VINCENT,
CHARLES H. TITUS.